United States Patent
Hay-Saikevich et al.

(10) Patent No.: US 12,549,455 B2
(45) Date of Patent: *Feb. 10, 2026

(54) SYSTEM AND METHOD FOR THE MANAGEMENT AND OPTIMIZATION OF SOFTWARE DEFINED NETWORKS

(71) Applicant: BE BROADBAND TECHNOLOGIES (BBT.LIVE) LTD., Lapid (IL)

(72) Inventors: David Hay-Saikevich, Tel Aviv (IL); Almog Duek, Hod HaSharon (IL)

(73) Assignee: BE BROADBAND TECHNOLOGIES (BBT.LIVE) LTD., Lapid (IL)

( * ) Notice: Subject to any disclaimer, the term of this patent is extended or adjusted under 35 U.S.C. 154(b) by 93 days.

This patent is subject to a terminal disclaimer.

(21) Appl. No.: 18/740,262

(22) Filed: Jun. 11, 2024

(65) Prior Publication Data

US 2024/0333605 A1    Oct. 3, 2024

Related U.S. Application Data

(63) Continuation of application No. 18/389,141, filed on Nov. 13, 2023, now Pat. No. 12,040,955, which is a (Continued)

(30) Foreign Application Priority Data

Nov. 8, 2022    (IL) .......................................... 298056

(51) Int. Cl.
*H04L 41/40* (2022.01)
*H04L 12/46* (2006.01)
*H04L 41/0806* (2022.01)

(52) U.S. Cl.
CPC .......... *H04L 41/40* (2022.05); *H04L 12/4633* (2013.01); *H04L 41/0806* (2013.01)

(58) Field of Classification Search
CPC . H04L 41/40; H04L 12/4633; H04L 41/0806; H04L 12/4641; H04L 41/0895; H04L 41/5054; H04L 41/122
See application file for complete search history.

(56) References Cited

U.S. PATENT DOCUMENTS 9,264,375 B2 * 2/2016 DeCusatis ........... H04L 41/0866
9,847,944 B2    12/2017 Chow et al.
(Continued)

FOREIGN PATENT DOCUMENTS

EP    3716063 A1    9/2020
EP    3934170 A1    1/2022
(Continued)

OTHER PUBLICATIONS

International Search Report and Written Opinion for International Patent Application No. PCT/IL2023/050788 mailed Nov. 1, 2023, 9 pages.

*Primary Examiner* — Michael Won
(74) *Attorney, Agent, or Firm* — Cozen O'Connor

(57) ABSTRACT

A system and method are presented for the generation and configuration of a software-defined network (SDN) utilizing highly adaptable multi-purpose gateway modules (xGWs) capable of speciation in order to fulfill various specific roles within the SDN, thereby providing an enhanced ability for data packet and data stream management that optimizes network performance while xGWs in the SDN are governable by a logically centralized orchestrator application which exercises comprehensive and autonomous control.

19 Claims, 9 Drawing Sheets

Related U.S. Application Data continuation of application No. PCT/IL2023/050788, filed on Jul. 31, 2023.

(56) References Cited

U.S. PATENT DOCUMENTS

| | | | |
|---|---|---|---|
| 10,904,125 | B2 | 1/2021 | Kolar et al. |
| 11,153,119 | B2 | 10/2021 | Sundararajan et al. |
| 11,336,570 | B1 | 5/2022 | Kn |
| 11,374,904 | B2 | 6/2022 | Mayya |
| 11,516,049 | B2 | 11/2022 | Cidon |
| 2007/0224969 | A1 | 9/2007 | Rao |
| 2010/0125675 | A1 | 5/2010 | Richardson |
| 2014/0092738 | A1 | 4/2014 | Grandhi |
| 2014/0341109 | A1 | 11/2014 | Cartmell et al. |
| 2015/0207677 | A1 | 7/2015 | Choudhury |
| 2016/0234039 | A1 | 8/2016 | Ng |
| 2016/0315808 | A1 | 10/2016 | Saavedra |
| 2017/0134186 | A1 | 5/2017 | Mukundan |
| 2018/0006935 | A1 | 1/2018 | Mutnuru |
| 2018/0302343 | A1* | 10/2018 | Lokman ............... H04L 47/125 |
| 2019/0349426 | A1 | 11/2019 | Smith |
| 2020/0059420 | A1 | 2/2020 | Abraham |
| 2020/0106696 | A1 | 4/2020 | Michael et al. |
| 2020/0162377 | A1 | 5/2020 | Sarva |
| 2020/0379839 | A1 | 12/2020 | Savalle et al. |
| 2021/0243053 | A1 | 8/2021 | Dunbar |
| 2022/0321362 | A1 | 10/2022 | Kanda |
| 2023/0104568 | A1 | 4/2023 | Miriyala |
| 2023/0275819 | A1 | 8/2023 | Mao |
| 2024/0283701 | A1* | 8/2024 | Reid ..................... G06F 9/455 |

FOREIGN PATENT DOCUMENTS

| | | |
|---|---|---|
| EP | 3985938 A2 | 4/2022 |
| EP | 4024787 A1 | 7/2022 |

\* cited by examiner

SYSTEM AND METHOD FOR THE MANAGEMENT AND OPTIMIZATION OF SOFTWARE DEFINED NETWORKS

CROSS-REFERENCE TO RELATED APPLICATIONS

This application is a continuation of U.S. application Ser. No. 18/389,141, filed Nov. 13, 2023, which is a continuation of international application PCT/IL2023/050788, filed Jul. 31, 2023, which claims priority to Israeli Patent Application No. 298056 filed Nov. 8, 2022. Each of the aforementioned applications are incorporated by reference herein as if fully set forth.

FIELD OF THE INVENTION

The present invention generally relates to a cloud computing solution for the operation of a software defined wide area network (SD-WAN), and in particular to the combination of an 'orchestrator' management software and a multi-purpose network gateway software (xGW) for the efficient, secure, and adaptive transmission of data through cloud computing networks.

BACKGROUND OF THE INVENTION

Wide Access Networks (WANs) are a class of networks that connect a geographically disparate collection of nodes with links/edges, providing a means for the communication of data between said nodes, wherein a WAN may contain one or more WANs within it, and itself be contained fully or partially within another network such as WANs or Local Access Networks (LANs). The performance of WANs can benefit significantly from optimization, as the data traffic within WANs may be subject to: significant packet loss; high latency; low bandwidth in relation to available LAN bandwidth; and poor path symmetry, among other issues. Software solutions for optimization may have various functions, including but not limited to: compression; de-duplication; caching; application acceleration; path selection; and various forms of transport flow optimization. Many solutions have been developed and disclosed that address one or more of the above issues.

The system and methods disclosed in U.S. Pat. No. 11,153,119B2 teach a software solution comprised of four interconnected programs: an orchestration software; software for the management of the WAN; one or a plurality of WAN fabric controllers; and one or a plurality of WAN edge routers, wherein these four appliances can be integrated in various combinations on different servers, depending on the network environment.

A data traffic/flow routing system and method is disclosed in US20140341109, wherein a single appliance operates as a converged gateway within a plurality of network types, wherein the single appliance operates a policy dynamically determining: data segregation; data prioritization; packet identification; among other functions. Another single appliance is disclosed in US2021/0243053 and teaches an edge node application, configured to be connected to one or more untrusted and trusted underlay networks, and operates a method that overcomes the scalability challenges posed by necessary exchanges of Border Gateway Protocol (BGP) messages between a local network controller and many SD-WAN nodes (which produce computational overloads on said local network controllers).

Within the general field of SD-WAN optimization, many techniques exist for measuring the performance of SD-WANs in order to better inform optimization strategies. One such technique is disclosed in U.S. Pat. No. 10,904,125, wherein a system and method for the measurement of SD-WAN tunnel metrics is achieved by clustering data traffic characteristics, generating packets mimicking that data using a neural network-based model, and using said packets to probe a target tunnel. Similarly, within the general field described, load-balancing between different WANs is a major role of SD-WAN management software solutions, such as the system and method disclosed in U.S. Pat. No. 9,847,944, in which data traffic bottlenecks can be mitigated by routing a portion of data originating from a LAN through one or more WAN backhauls, and in which WAN backhauls can be utilized to perform self-healing operations with multiple distinct LANs.

Bottleneck formation are among myriad risks posed by tunnel connections within SD-WANs that several of the aforementioned publications disclose methods of detecting or managing. Similarly, a method for the predicting and proactively backup-rerouting failed tunnels is disclosed in US20200379839, where a machine learning model is used to determine the satisfactory fulfillment of service level agreements (SLAs) required by traffic within a tunnel. Partial rerouting of data traffic is achieved in the publication US20200379839 as it is in many other inventions disclosed or otherwise known in the field.

The field of SD-WAN and other software defined networks (SDNs) optimization is a broad one, seeking to solve the highly dynamic and interconnected set of performance problems experienced by networks connected between many nodes, over many points of presence (PoPs), using infrastructure provided by many providers of the underlying infrastructure, and subject to turbulence caused by physical data transmission fluctuations, data traffic fluctuations, as well as the operations and interactions of a similarly dynamic set of software applications managing traffic within the networks.

SUMMARY OF THE INVENTION

The present invention discloses a system and method for the creation of a software defined network (SDN) using: one or more orchestrator applications; and one or more multi-purpose gateways (xGWs) which may be configurable in a variety of forms with a variety of functions that provide a division of labor that serve to produce a highly durable and efficient network in the data plane and a highly effective and distributable control structure in the control/management plane The following embodiments and aspects thereof are described and illustrated in conjunction with systems, devices and methods which are meant to be exemplary and illustrative and not limiting in scope. In various embodiments, one or more of the above-described problems have been reduced or eliminated, while other embodiments are directed to other advantages or improvements.

According to one aspect, a software defined network is produced by the use of: one or more multi-purpose gateway applications, henceforth referred to as 'xGWs', deployed to receive and send data packets and streams thereof through channels; and at least one logically centralized orchestrator application, henceforth referred to as 'orchestrator', deployed to autonomously control all xGWs within the software defined network. Channels may refer to plain communication links, encrypted tunnels, or other means of monodirectional and bidirectional data communication. The one or more xGWs within the software defined network are configurable as several different variations with different responsibilities, capabilities, and policy protocols, which, when deployed with the use the orchestrator, produce a software defined network with significantly improved resiliency and availability of service to users when compared to other systems and techniques in the field.

According to another aspect, any xGW may be configurable as an: internal gateway (IGW); local gateway (LGW); cloud gateway (CGW); a zone gateway (ZGW); or a host gateway (HGW), each of which will contain internal policies that define capabilities and responsibilities within the software defined network. For example, the CGW may perform processes on data packets, such as deep packet inspection (DPI), and may provide other xGWs with a means of classification for steering data streams throughout the software defined network.

According to another aspect, the subnets formed between different xGWs and different tenants over underlying infrastructure provided by different providers of underlying infrastructure may be managed by one or more software defined network formed and managed by the present invention, allowing for seamless and secure service provided to tenants' users across a diverse range of access points.

An advanced system allowing for multi-tenancy constitutes another aspect of this invention, applied both within the xGWs and the orchestrator. xGWs can support separate but overlapping IP subnets for different tenants, whilst maintaining complete isolation between both the tenants' network control and their data traffic, by utilizing virtual routing and forwarding (VRF), wherein a digital tag is applied to data packets by the xGW. In the control plane defined by the orchestrator in the management plane, a hierarchical system of user profiles provides multi-tenancy functionality, wherein permission to observe actions taken and data sent by descendant profiles is granted to parent profiles according to parameters defined by said parent profile, and wherein other parameters defined by the parent profile may permit descendent profiles of the same parent to also observe actions and data sent by each other. The effect of this aspect of the invention is to provide multiple tenants with a resilient, adaptable, and available service on the same one or more networks that also ensures the security of their data and network and control by completely isolating them from each other. The only means by which two separate tenants might communicate with each other is the creation of a special pathway by the orchestrator.

Zero touch provisioning (ZTP) is another aspect of this invention, wherein applications can be installed and configured on a remote device or other consumer premises equipment (CPE) with no requirement for an onsite employee skilled in the art, expanding the scope of devices, use cases, and users capable of benefiting from a software defined network. Bootstrap installation of an xGW application can be achieved by loading the application to a remote device, starting up said xGW, at which point the xGW will automatically establish a connection with a bootstrap server on a dedicated management POP, signaling an orchestrator to establish connection with the xGW to configure a profile associated with a license of a specific tenant, leading to a the bootstrap server to configure settings on the xGW relating to IP subnets and the designation of connections with other addresses, finally leading the bootstrap server to allocate and subsequently connect adjacent xGWs, in order to produce software defined networks that can withstand the partial loss of communication with one or more xGWs or PoPs. The allocation of adjacent xGWs for optimal use as backup nodes for ensuring continual operation of software defined networks during lapses connectivity is achieved by careful calculation of the risks, costs, and mitigations thereof associated with establishing xGWs and tunnels on PoPs.

According to another aspect of this invention, xGWs may infer changes in bandwidth without directly measuring bandwidth, and thus conserving computational resources, by employing periodic latency measurements and inferring changes thereof to correspond to changes in bandwidth.

According to another aspect of this invention, the communication of data packets and streams thereof may be transferred to other xGWs within an SD-WAN when said communication is detected to be unfavorably distributed over the capacities of xGWs available for communication. This redistribution may be known as 'load rebalancing' and may or may not be autonomously operated in response to measured or estimated detections in bandwidth.

According to another aspect of the invention, a system for producing a software defined network (SDN) between multiple communicable devices comprises: one or more multipurpose gateway application (xGW), wherein each xGW can receive and send data packets and streams thereof through one or more channels and wherein said xGWs can aggregate and isolate such data packets or streams thereof in order to optimize performance of the SDN, and wherein each xGW is configurable for certain SDN operability; and at least one logically centralized orchestrator application (orchestrator) connecting directly or indirectly all of the said xGWs within a SDN, whereby all said xGWs are thus autonomously controllable by an orchestrator.

According to another aspect of the invention, said xGWs within a SDN are configurable in various configurations such as a local internal gateway (IGW); a local gateway (LGW); a cloud gateway (CGW); a zone gateway (ZGW); or a host gateway (HGW); wherein a CGW may perform deep packet inspection (DPI) and provide HGW/IGW/LGW/ZGW configured xGWs with a means of classification for steering data.

According to another aspect of the invention, data packets and streams thereof of multiple tenants or users thereof utilizing at least one form of underlying infrastructure may be secured by being processed through at least one xGW forming at least one subnet within a SDN, wherein such xGW designates a tag for each tenant or user thereof by virtual routing and forwarding (VRF).

According to another aspect of the invention, an orchestrator operates an adaptive hierarchy of profile classifications to enable communication between tenants or users thereof on the same SDN.

According to another aspect of the invention, an orchestrator defines user profiles and grants access thereto according to a hierarchical system of data access, wherein parent profiles can observe actions by descendent profiles, and profiles sharing a parent can observe each other's actions according to permissions defined by the parent profile.

According to another aspect of the invention, a method of operating an SDN can comprise of the following steps: (i) using one or more xGWs and at least one orchestrator to produce a SDN; (ii) data packets and streams thereof are received by xGWs from downstream and upstream links; (iii) aggregating the data packets and streams thereof according to orchestrator defined policy; (iv) storing the data packets in an xGW's shared buffer; and (v) forwarding tunneled data packets according to an xGW's scheduling. According to another aspect of the invention, the aggregation process employed in step (iii) of the method of operating a SDN is: packet-by-packet bonding; multicasting;

failover; per session bonding; top-up; deep packet inspection (DPI) supported by static tunnel assessment; deep packet inspection (DPI) supported by dynamic tunnel assessment; QoS forwarding, or a combination thereof. According to another aspect of the invention, the forwarding process employed in step (v) of the method of operating a SDN is managed in an optimal manner by a buffer management thread, wherein a scheduling algorithm adapts prioritization of data packet forwarding according to tunnel bandwidth and tunnel latency, wherein measurement of the former is performed on rare occasions and the latter is measured on a relatively constant basis.

According to another aspect of the invention, the scheduling process employed in step (v) of the method of operating a SDN utilizes a deficit round robin (DRR) method for applying and adjusting weights to tunnels in the form of credits, wherein the tunnel will send a volume of data proportional to the credit it receives each renewal cycle, and the renewal of credits is adapted according to tunnel latency measurements.

According to another aspect of the invention, a method of zero-touch provisioning (ZTP) can be operated for the remote bootstrap installation of software defined network applications on a device, can comprise of the following steps: (i) on the device, an xGW application is loaded and opened, (ii) the xGW establishes a connection to bootstrap server located on a dedicated management point of presence (POP), (iii) the bootstrap server signals an orchestrator to establish communication with the xGW, (iv) the orchestrator configures the xGW with a profile according to a license associated with a specific user, (v) the bootstrap server configures settings of the xGW relating to IP subnets and the designation of connections with other addresses within a tenant's software defined network, (vi) the bootstrap server allocates adjacent xGWs as being optimal for connection, and then connects the xGW said adjacent xGWs, in order to produce software defined networks that can maintain operation if any of the xGWs experience a lapse in connection.

According to another aspect of the invention, the above steps (iii) and (iv) of the method of ZTP can be achieved manually by a user, wherein the user receives an email providing activation instructions for the initial configuration of the xGW on the device.

According to another aspect of the invention, allocation of adjacent xGWs is achieved by calculating risk and mitigation thereof arising from the consideration of factors including but not limited to: the Pops most easily communicated with; the computational resources at those PoPs;

the cost of establishing a backup xGW at those PoPs; the number of backup xGWs required at those PoPs; the cost of establishing a tunnel between xGWs at those PoPs; and the number of tunnels required at those PoPs.

BRIEF DESCRIPTION OF THE FIGURES

Some embodiments of the invention are described herein with reference to the accompanying figures. The description, together with the figures, makes apparent to a person having ordinary skill in the art how some embodiments may be practiced. The figures are for the purpose of illustrative description and no attempt is made to show structural details of an embodiment in more detail than is necessary for a fundamental understanding of the invention.

In the Figures.

DETAILED DESCRIPTION OF SOME EMBODIMENTS

Figure 1:
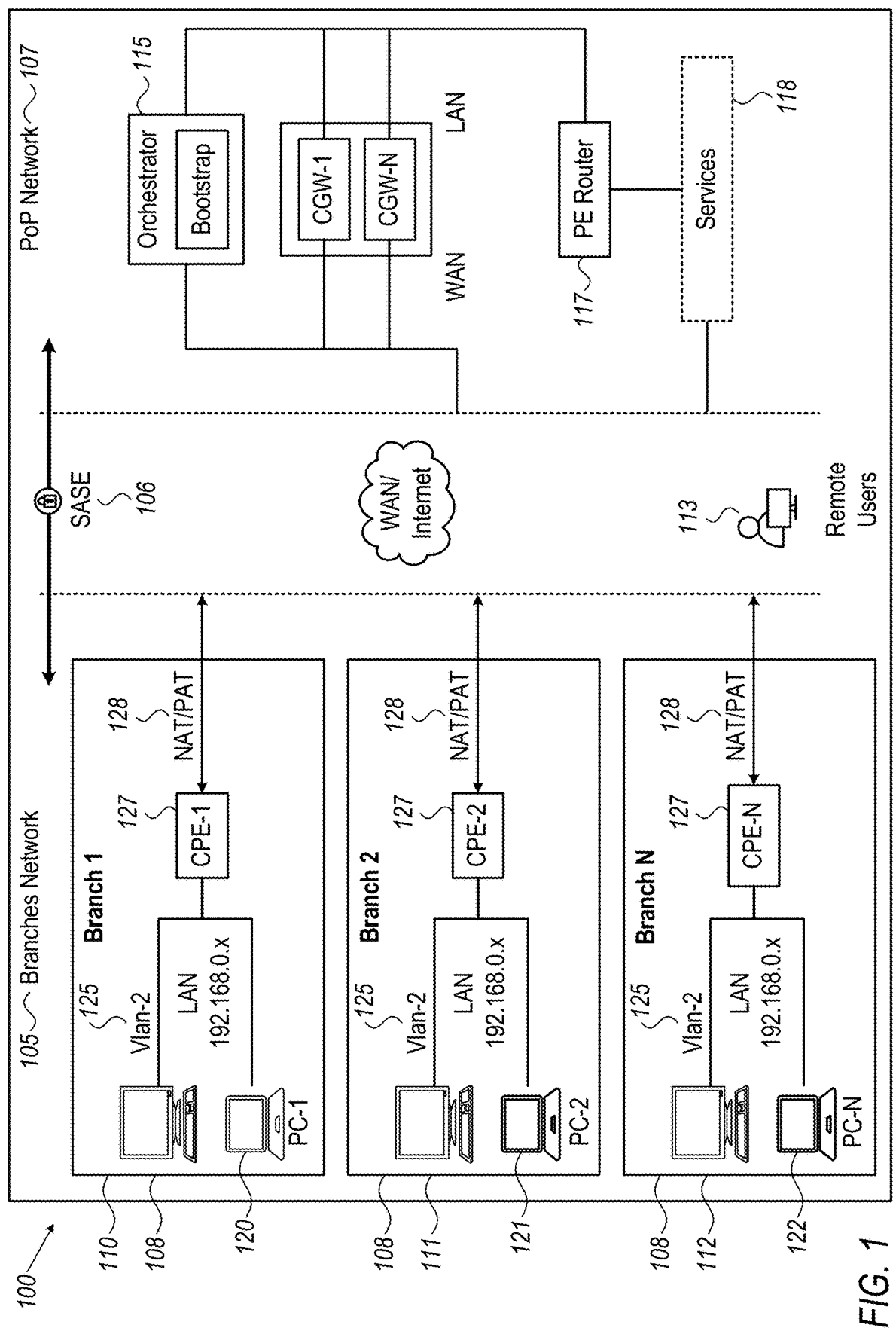
FIG. 1 shows an overview of the network architecture of a typical system in the prior art

In the following detailed description, numerous specific details are set forth in order to provide a thorough understanding of the invention. However, it will be understood by those skilled in the art that the present invention may be practiced without these specific details. In other instances, well-known methods, procedures, and components, modules, units and/or circuits have not been described in detail so as not to obscure the invention. Some features or elements described with respect to one embodiment may be combined with features or elements described with respect to other embodiments. For the sake of clarity, discussion of same or similar features or elements may not be repeated.

Unless explicitly stated, the method embodiments described herein are not constrained to a particular order or sequence. Additionally, some of the described method embodiments or elements thereof can occur or be performed simultaneously, at the same point in time, or concurrently, or individually.

The term 'Data Plane' as used herein refers all functions and processes that communicate data packets and streams thereof from one node to another, and by extension to all the parts of the network that facilitate said functions and processes. The term 'Control/Management Plane' as used herein refers to all functions and processes that determine which channels data packets and streams thereof are communicated on, and by extension to all parts of the network that facilitate said functions and processes. The term 'Control Plane' as used herein and when used alone refers to aspects and features of the Control/Management Plane that are automated. The term 'Management Plane' as used herein and when used alone refers to all aspects and features of the Control/Management Plane that require an interface with human personnel.

The term 'underlying infrastructure' as used herein refers to the internet and cloud services on which PoPs are hosted and within and between which data packets and streams thereof are transmitted. Underlying infrastructure may be provided for by one or many providers, referred to herein as 'providers of underlying infrastructure'.

The terms "customer", "tenant", "branch" and "user", as used herein, refer to: the manager of the overall network operating the system and method disclosed in the present invention; an entity procuring network management services from the customer; a physical or virtual location belonging to the tenant and to which network management services are contracted; and devices operated by the tenants within or outside of branches, respectively.

The terms "secure access service edge" or "SASE" as used herein, refer to the plane of communication connecting physical devices belonging to tenants, branches, and users, from the cloud computing networks managed by customers. In some contexts, the terms "secure access service router" or "SASE" may refer to specific or limited number of edges within the aforementioned plane of communication, whilst in others it is understood to refer to the entire plane in general.

The present invention discloses a system and method for producing a software defined network by utilizing at least on version of two types of applications: an xGW (multi-purpose gateway); and an orchestrator, wherein the former can be configured as: a cloud gateway (CGW); a zone gateway (ZGW); an internal gateway (IGW); a local gateway (LGW); or a host gateway (HGW). One or more xGWs in various configurations can be distributed over various PoPs and connect with one or more different tenants devices operated by one or more different tenants. The orchestrator application or applications that form part of the software defined network communicate with one or more of the xGWs in order to autonomously monitor and control all xGWs in the software defined network.

According to some embodiments, one or more orchestrator applications may be situated on a dedicated server representing a separate POP to those to which tenant devices are directly connected.

According to some embodiments, connections between tenant devices and xGWs, between different xGWs, and between orchestrator and xGWs, can be channels of many kinds, such as plain communication links, encrypted tunnels, or any other means of monodirectional and bidirectional data communication.

According to some embodiments, data and control systems thereof belonging to different tenants can be managed on the same xGW whilst maintaining complete isolation between said data and said controls systems belonging to said tenants by employing a virtual routing and forwarding (VRF) protocol wherein a tag is applied to data packets that identifies them as belonging to specific tenant. This provides a multi-tenancy functionality at the level of the xGW, ensuring that any xGW in a software defined network can serve as an effective medium for any tenant within the software defined network, whilst minimizing risks to the privacy or security of clients' data.

According to some embodiments data and control systems thereof belonging to different tenants can be managed on the same software defined network by assigning each tenant to a profile within a hierarchical system of profiles managed by an orchestrator application, wherein profiles are divided between parent profiles and descendant profiles, wherein parent profiles are independent of each other and each descendent profiles is dependent upon a single parent profile. Each parent profile may have one or more descendant profiles, or none at all, and may define the rules of data observation and data access Reference is made to FIG. 1, which illustrates the architecture of a conventional software defined network. The arrangement of the conventional network 100 is composed of three sections: the branch network 105; the secure access service edge (SASE) 106; and the cloud/POP network 107.

In the conventional arrangement 100, each branch in the branch network 105, for example the three branches 110, 111, and 112, with device groups 120, 121, and 122, respectively, have required network architectures 108 wherein branches maintain their own virtual local access networks (VLAN) connections 125 and conventional local access networks (LAN), connected to local consumer premises equipment (CPE) 127 and connect to the internet through network access translation (NAT) and port access translation (PAT) communication channels 128. According to some embodiments, local consumer premises equipment (CPE) 127 connects to the internet via MPLS xDSL connections or via mobile cellular connections. Data is communicated through the SASE 106, where remote users 113 join the data stream and the cloud/POP network 107 to one or more clusters of software programs with analogous functions to the CGWs presented in this invention or through an orchestrator 115. Conventional architecture may in some cases operate utilizing a communication plane distinct from the SASE as defined herein, instead relying on other mechanisms within the broader category of services provided by a network service provider. Data communicated through the network can be serviced by a bundle of different processes 118 through a provider edge router 117. Processes 118 may include SDP/VPN, or firewalls, centrex-like services, or other services. The architecture of the arrangement 100, which is a conventional arrangement of a network of nodes, channels, and services, presents many dependencies on individual channels in order for the operability of all functions within the network to be maintained.

Figure 2:
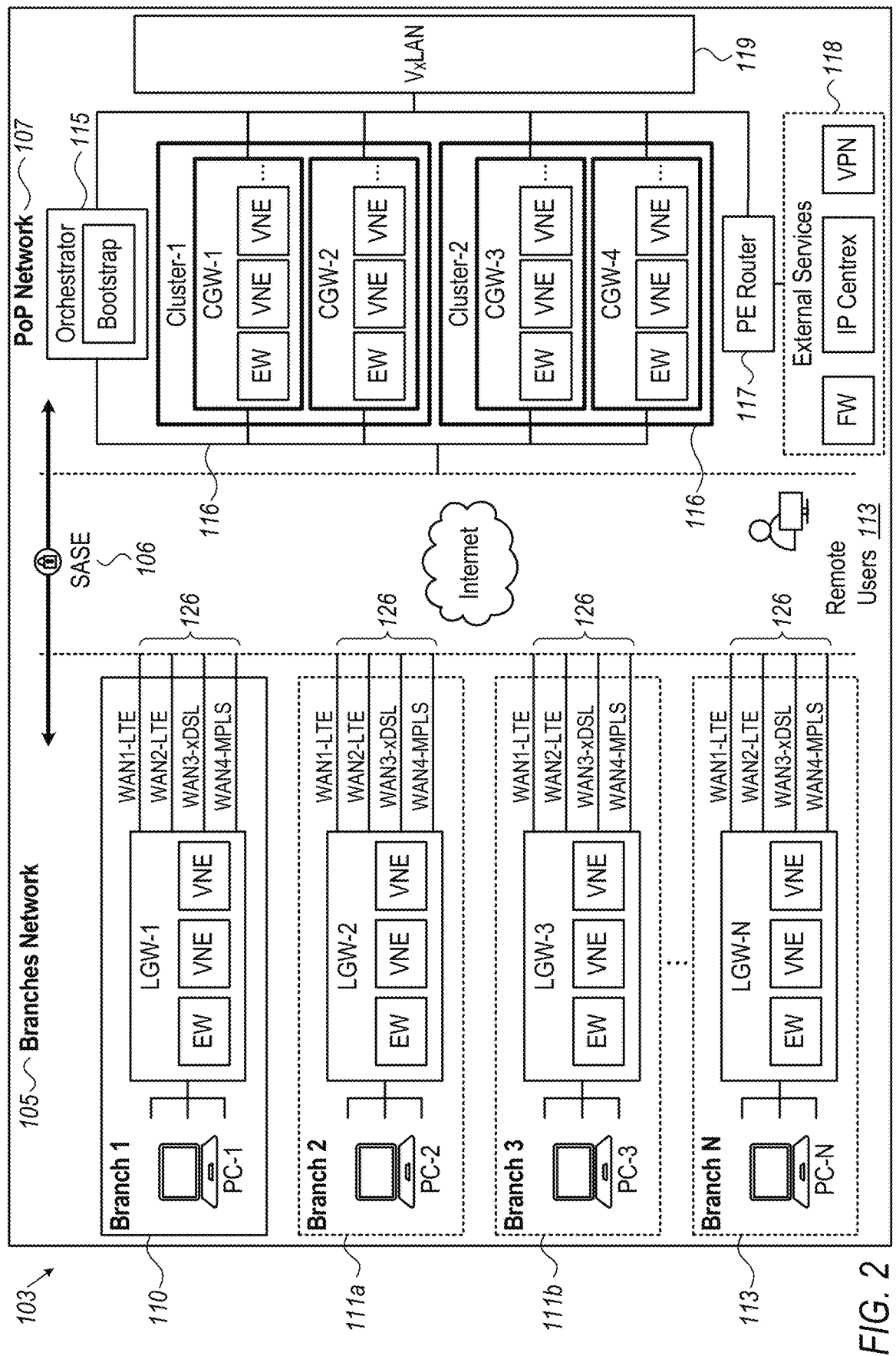
FIG. 2 illustrates an overview of the multi-tenancy structure within the network architecture of a typical system by the presented invention

Reference is made to FIG. 2, which illustrates the multi-tenancy architecture of a software defined network of the present invention. The arrangement of the conventional network 103 is composed of three sections: the branch network 105; the secure access service edge (SASE) 106; and the cloud/POP network 107. In the conventional arrangement 103, each branch in the branch network 105, for example the four branches 110, 111a, 111b and 112 connect to the internet via a range of wide access networks (WANs) 126, wherein the two branches 111a and 111b belong to the same first tenant, whilst the branches 110 and 112 belong to a second and third tenant, respectively. Data is communicated through the SASE 106, where remote users 113 join the data stream to and the cloud/POP network 107 to one or more clusters 116 of CGWs or through an orchestrator 115. Data communicated through the network can be serviced by a bundle of different processes 118 through a provider edge router 117. The architecture of the arrangement 103, which is an arrangement of a network of nodes, channels, and services, presents many dependencies on individual channels in order for the operability of all functions within the network to be maintained. Data may also be communicated to and from clusters 116 through a VLAN/VxLAN 119.

Figure 3:
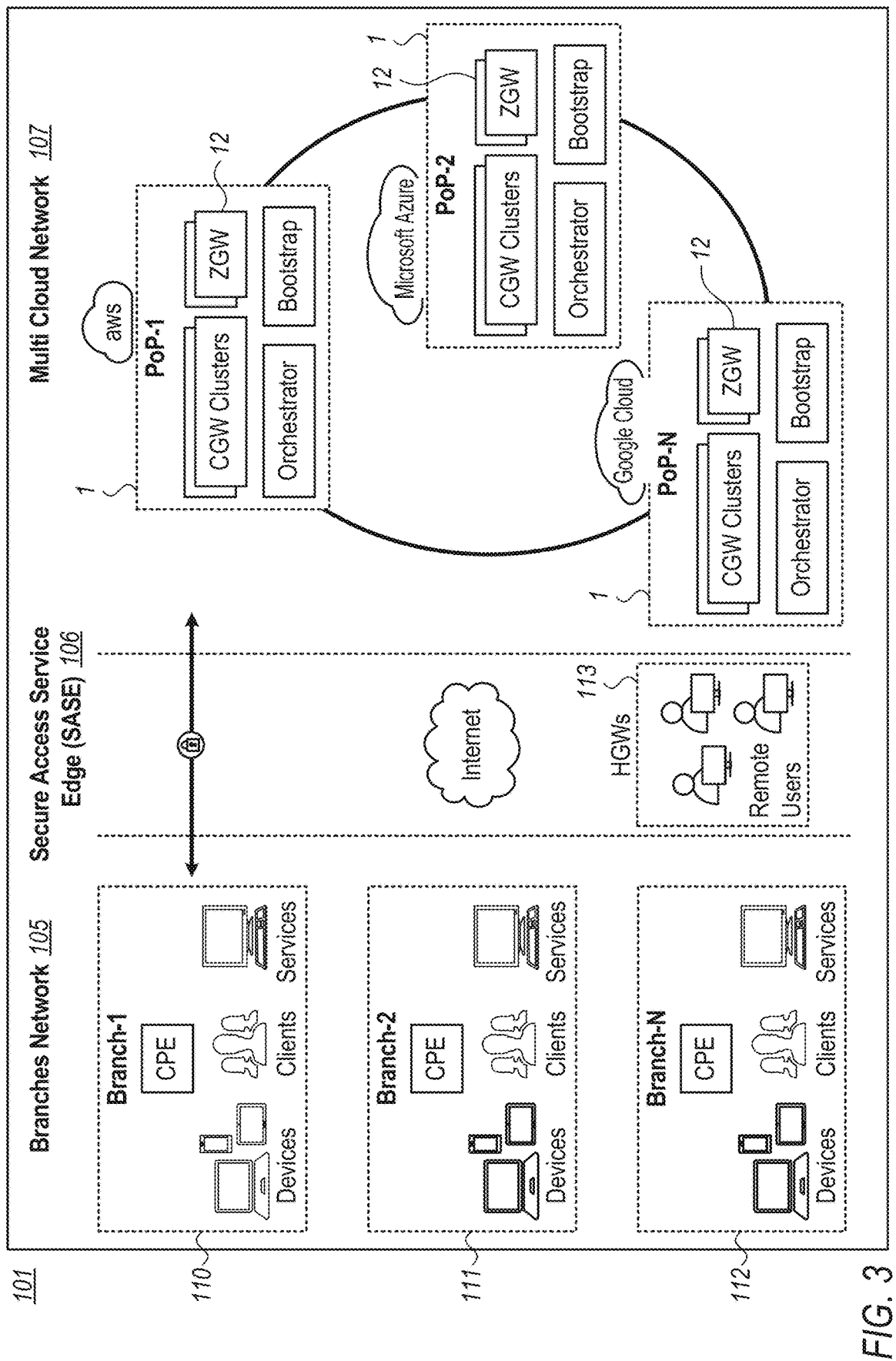
FIG. 3 illustrates a high level overview of the multi cloud network architecture of an example of a system produced by the presented invention.

Reference is made to FIG. 3, which illustrates the architecture of the SD-WAN created by the present invention, using comparable terms to the conventional arrangement 100 outlined in FIG. 1. The arrangement 101 allows for a simpler configuration of roles within the SD-WAN, allowing devices in each of the three branches 110, 111, and 112 services without the complications of required network architecture. These branches 110, 111, and 112, and additional connections from remote users 113 connect through the SASE 106 to the cloud/POP network 107, where the presented invention discloses a system of PoPs 1 on which one or more xGWs and one or more orchestrators may be present. In particular, at least one xGW configured as a ZGW 12 is present in each PoP 1 which provides the means of communication between the PoPs 1, such that at least two xGWs configured as a ZGW 12 are required in order to connect two PoPs 1 together. According to some embodiments, the xGW through which remote users 113 connect through the SASE 106 to the cloud/POP network 107 is configured as a host gateway (HGW).

Figure 4:
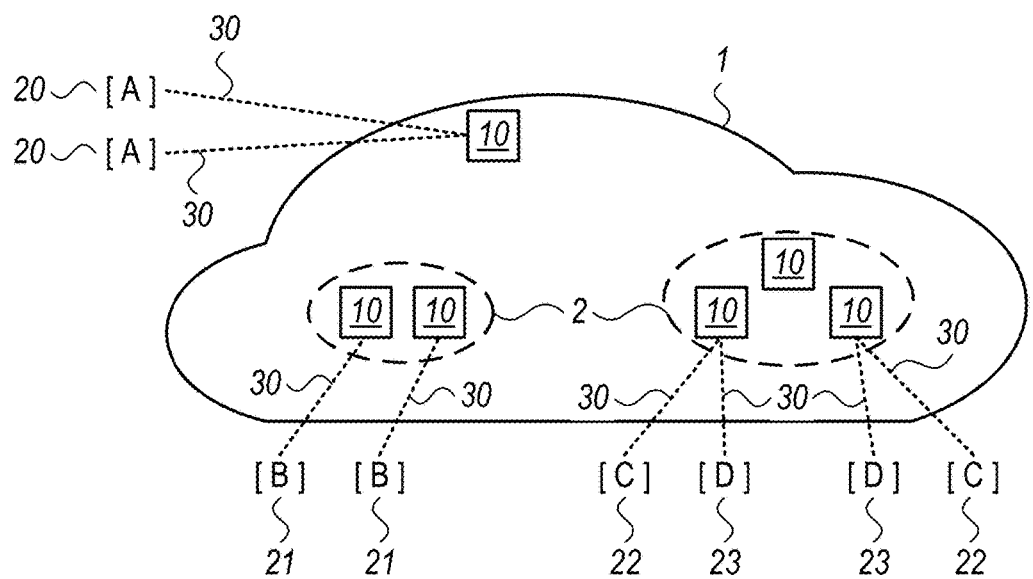
FIG. 4 shows an overview of clusters xGWs on a single POP
Figure 5:
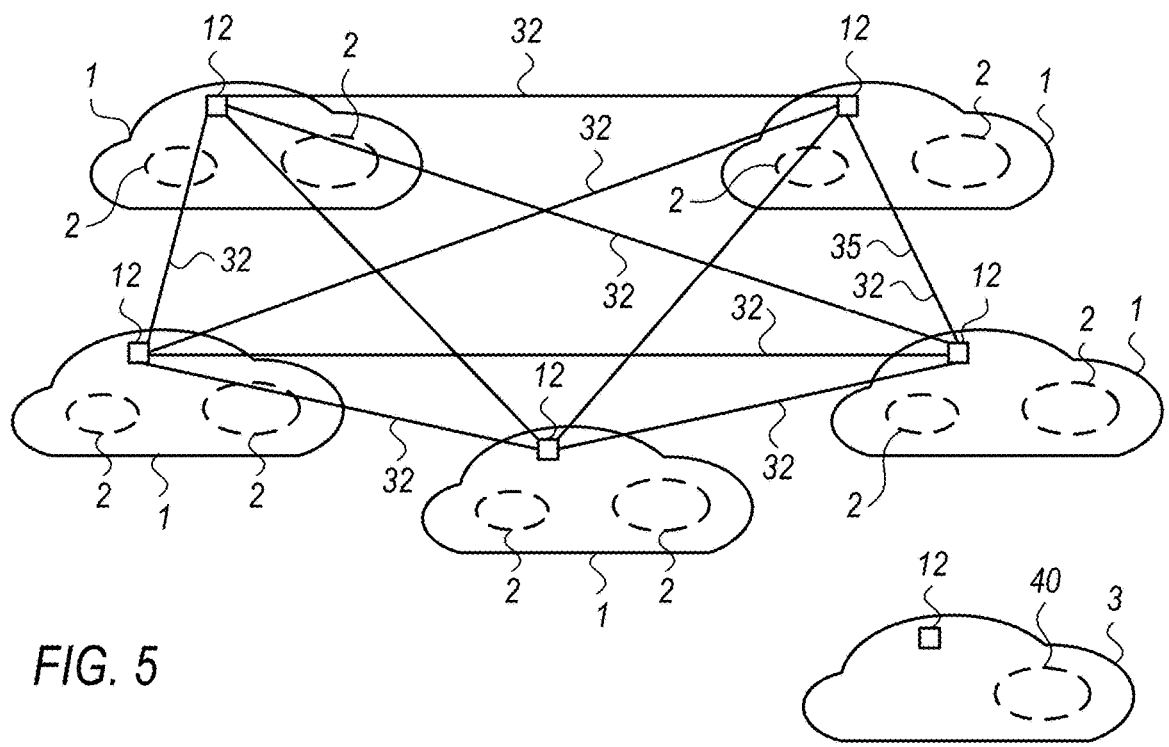
FIG. 5 shows an overview of several xGWs in several POP s

Reference is made to FIG. 4, which illustrates several xGWs configured as CGWs 10 operating within a single PoP 1, to which multiple tenant devices belonging to multiple tenants 20, 21, 22, and 23, are connected. Within the POP 1, xGWs, either configured as CGWs 10 or otherwise, may be grouped together in clusters 2 or not. Particular reference is made to the ability of a single xGW, in the case illustrated by FIG. 4 configured as a CGW 10, to host multiple devices belonging to one or more tenants. For example, a cluster 2 within a PoP 1 may contain xGWs, in the case illustrated by FIG. 4 configured as a CGWs 10, that each serve a singular tenant, in the example illustrated by FIG. 4 as CGWs 10 in a cluster 2 each serving a singular device belonging to the same tenant 21, or serving multiple devices belonging to different tenants 22 and 23. Alternatively, an xGW in the case illustrated by FIG. 4 as configured as a CGW 10 that exists on the POP 1 outside of any cluster 2, and may also be in communication with one or more devices belonging to one or more tenants. The multi-tenancy functionality demonstrated here is maintained at the level of the xGWs, in the case illustrated by FIG. 4 configured as a CGWs 10, by utilizing VRF protocols to tag data packets belonging to different tenants, and thus to ensure total isolation of data packets and control thereof between different tenants. Connections 30 between devices belonging to tenants 21, 22, 23, and 24, and xGWs 10 within a POP 1 may be realized as plain communication links, encrypted tunnels, or any other means of monodirectional and bidirectional data communication Reference is made to FIG. 5, which illustrates several different PoPs 1 in a software defined network including in which a dedicated bootstrap server POP 3 is a necessary function. Within each POP 1 can exist one or more xGWs 10 within or outside of one or more clusters 2. Within each PoP 1 can exist one or more xGWs configured as a zone gateway (ZGW) 12, which can communicate with each other between PoPs 1 via communication channels 32, wherein the combination of channels 32 forms the global backbone 35 of the software defined network. According to some embodiments, ZGWs 12 may be used to connect different PoPs 1 to each other when said different PoPs exist on underlying infrastructure provided by the same or different providers of underlying infrastructure. The total software defined network, including all tenant devices 21, 22, 23, 24, on all xGWs 10, within all clusters 2, on all PoPs 1, connected with the global backbone 35, are controlled autonomously by an orchestrator application 40 that may or may not exist on a separate server as POP 3. The use of the separate dedicated server 3 for the bootstrap protocols operated by an orchestrator 40 affords the overall software defined network with a centralized means of software management that is not subject to the risks experienced by PoPs 1 that may be managed by tenants or third-party entities.

Figure 6:
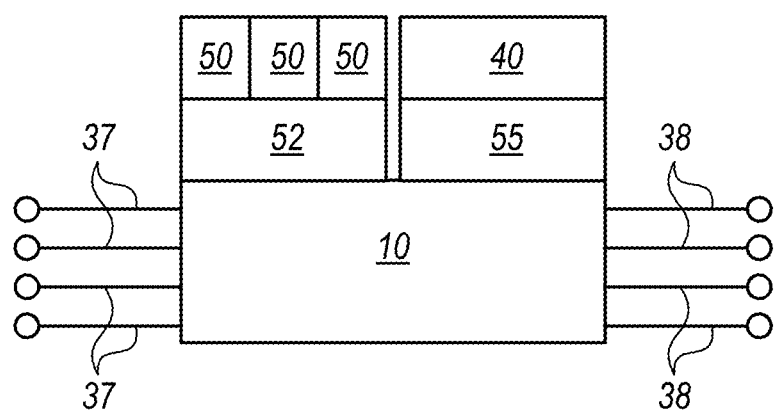
FIG. 6 illustrates the architecture of an xGW applications

Reference is made to FIG. 6, which illustrates the basic architecture of each xGW 10, where each xGW 10 is in communication with: one or more downstream links 37; one or more upstream links 38; one more virtual network function (VNF) or cloud network function (CNF) applications 50 through one or more relevant application programming interfaces (APIs) 52; and one or more orchestrator applications 40 through relevant control links 55. According to some embodiments, the control links 55 providing means of the communication between one or more orchestrator applications 40 and the xGW 10 may be via an application programming interface (API). According to some embodiments, VNFs with which the xGW 10 is in communication with are services associated with network security or network optimization. According to some embodiments, VNFs may be embodied as virtual machines or as applications operated within virtual machines and containers thereof.

Figure 7:
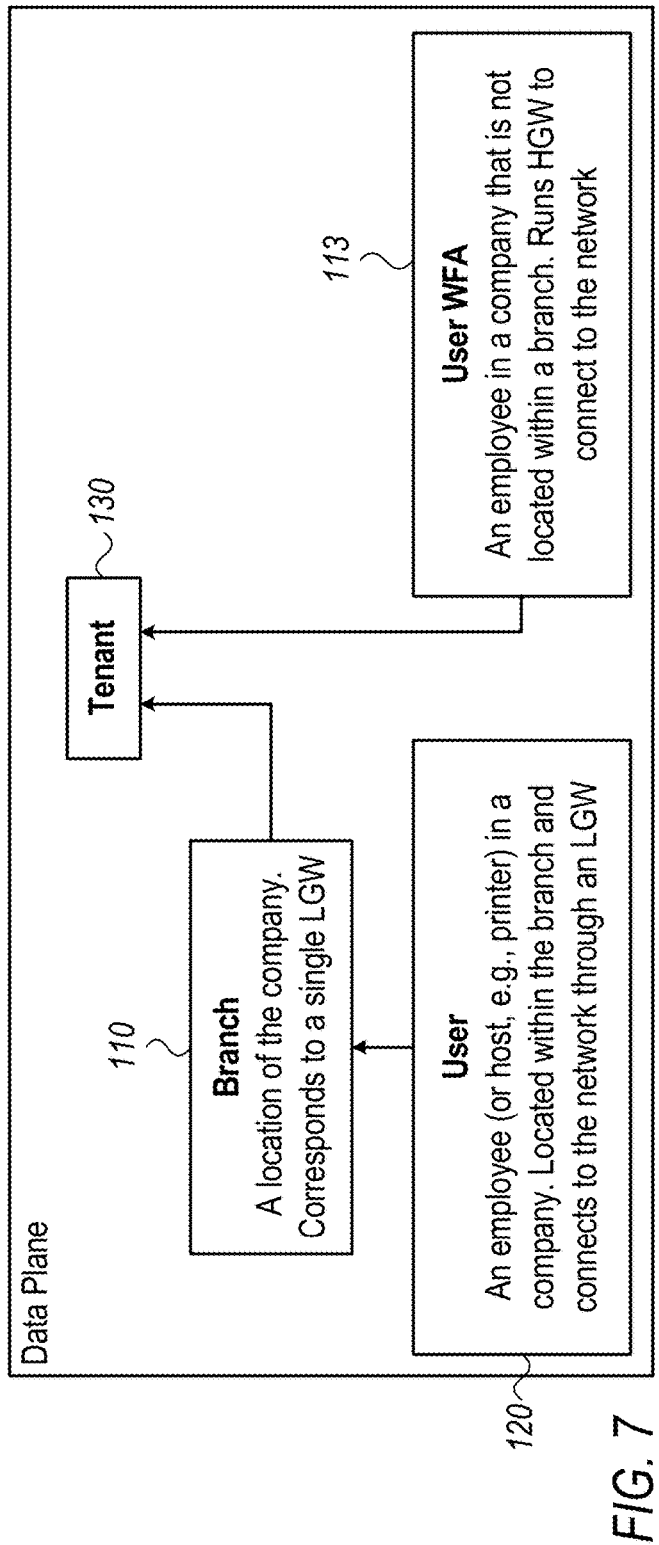
FIG. 7 illustrates the hierarchical system of profiles within the control/management plane.

Reference is made to FIG. 7, which illustrates an example of the hierarchical system of profiles within a data plane, wherein a tenant 130 may have one or more branches, for example 110, with one or more user devices, for example 120. Furthermore, a tenant may also be in communication with one or more user WFAs 113.

Figure 8:
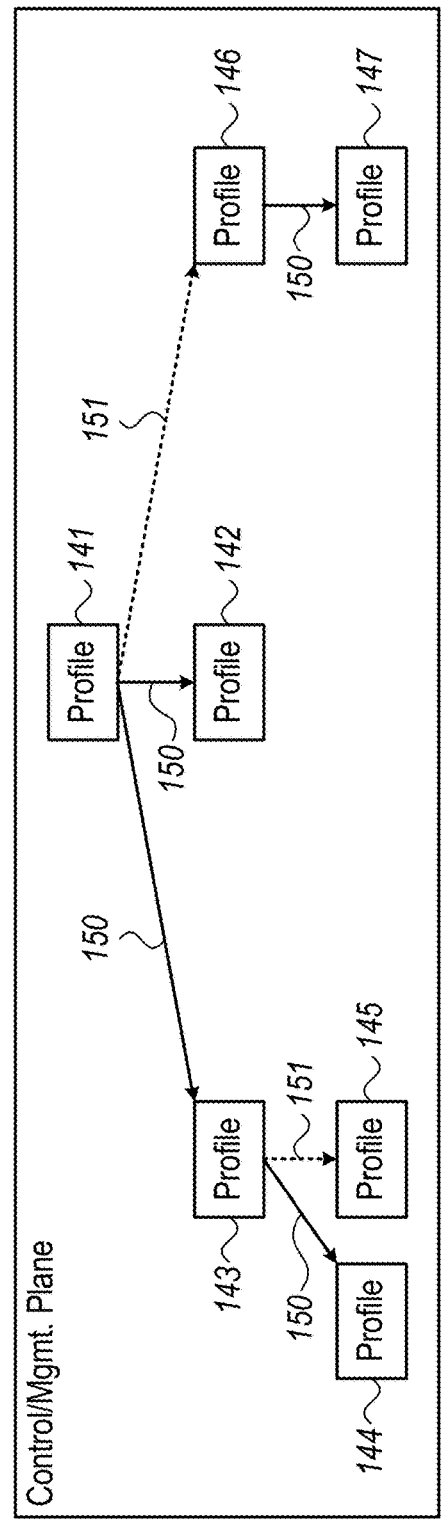
FIG. 8 illustrates the hierarchical system of profiles within the data plane

Reference is made to FIG. 8, which illustrates an example of the hierarchical system of profiles within a control/management plane. A single profile 141 behaves as a parent profile in having three descendent profiles 142, 143, and 146, where profile 143 and 146 also behave as parent profiles in having descendent profiles 144, 145, and 147, where profiles 144 and 145 have the parent profile 143 and the profile 147 has the parent profile 146. Parent profiles can define a some or all of its capabilities to its descendent profiles. Particular reference to the connections between parent and descendent profiles, where the connections 150 indicate 'managed relationships', where communication between parent and descendent profiles is managed by the parents, as in the relationships between: 141 and 142, 141 and 143, 146 and 147, and between 143 and 144, whilst other connections between parent and descendent profiles are 'self-managed relationships' 151 wherein the descendent profile can actively share information with its parent profile, as in the relationships between 143 and 151 and between 146 and 141. An orchestrator application defines for both parent profiles the distinction between and permissions for the 'managed relationship' and 'self-managed relationship'. According to some embodiments, a parent profile provides network resources to descendent profiles with both 'managed' and 'self-managed' relationships but has a greater level of resource control and observability over which and into the activity of those descendent profiles with which the parent profile has 'managed' relationships than those with 'self-managed relationships. According to some embodiments, a single profile may be shared by multiple users, wherein one or more users have access to and use of a single profile and are able to observe the actions of other users on the shared profile.

Figure 9:
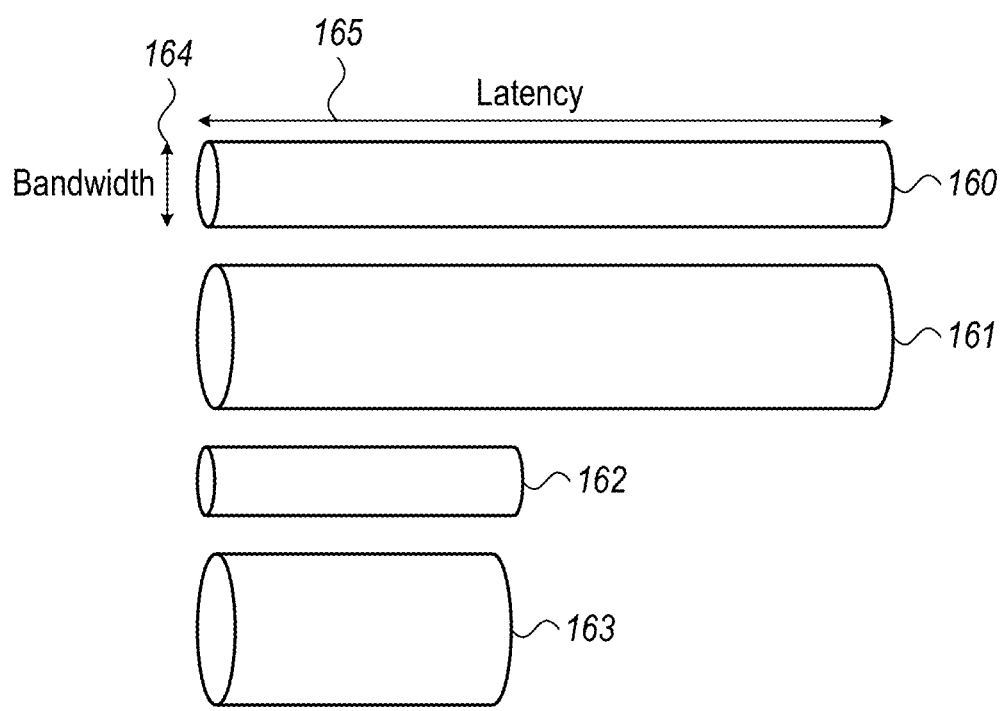
FIG. 9 illustrates a hydraulic analogy for the estimation of changes in bandwidth in a network using measurements of latency

Reference is made to FIG. 9 illustrates a hydraulic analogy for the estimation of changes in bandwidth in a network using measurements of latency, wherein the channels between nodes in a network are analogized to fluid flowing through pipes. Four different fluid volumes are displayed, analogizing four different channels: a long and narrow volume 160; a long and wide volume 161; a short and very narrow volume 162; and a short and wide volume 163. The length of the volume of fluid flowing 160, which within the analogy outlined is measured by at a fixed point as the velocity of said volume, is analogized as latency, whilst the width of the volume of fluid flowing 164, which within the analogy outlined is measured at a fixed point as the flow rate, is analogized as bandwidth. Inherent limitations in the physical architecture of computers mean measurements of bandwidth require more computational resources than measurements of latency, presenting SD-WANs with requirements to understand how both parameters vary in operation with a challenge in defining the most efficient ways in expending said computational resources. The presented invention discloses a method to estimate changes in bandwidth 164 without any direct measurement thereof by periodically measuring latency 165 and calculating bandwidth changes.

Figure 10:
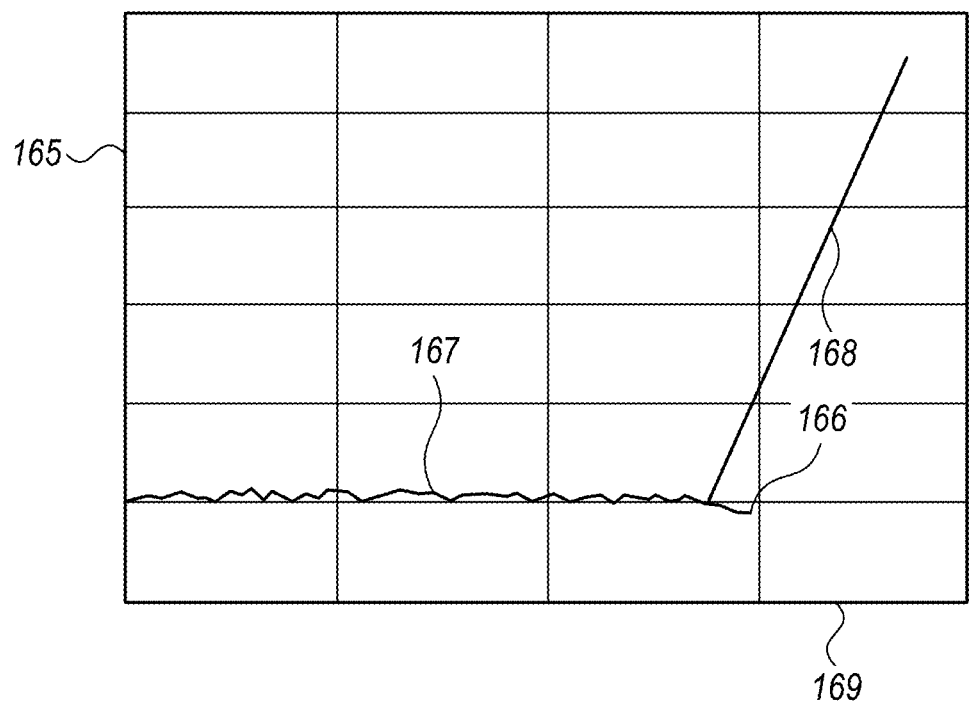
FIG. 10 illustrates the relationship between bandwidth reduction event and measured latency

Reference is made to FIG. 10 which illustrates the relationship between bandwidth reduction event and measured latency. A channel with a variable bandwidth and variable latency is observed as an example of latency 165 over time 169. Latency 165 of the channel is measured at regular time intervals, where it is maintained at general stable level 167. A network event 166 occurs and the observed latency 165 rises significantly 168. The disclosed invention allows for the detection of this network event 166 in time without needing to directly measure the bandwidth of the channel.

Figure 11:
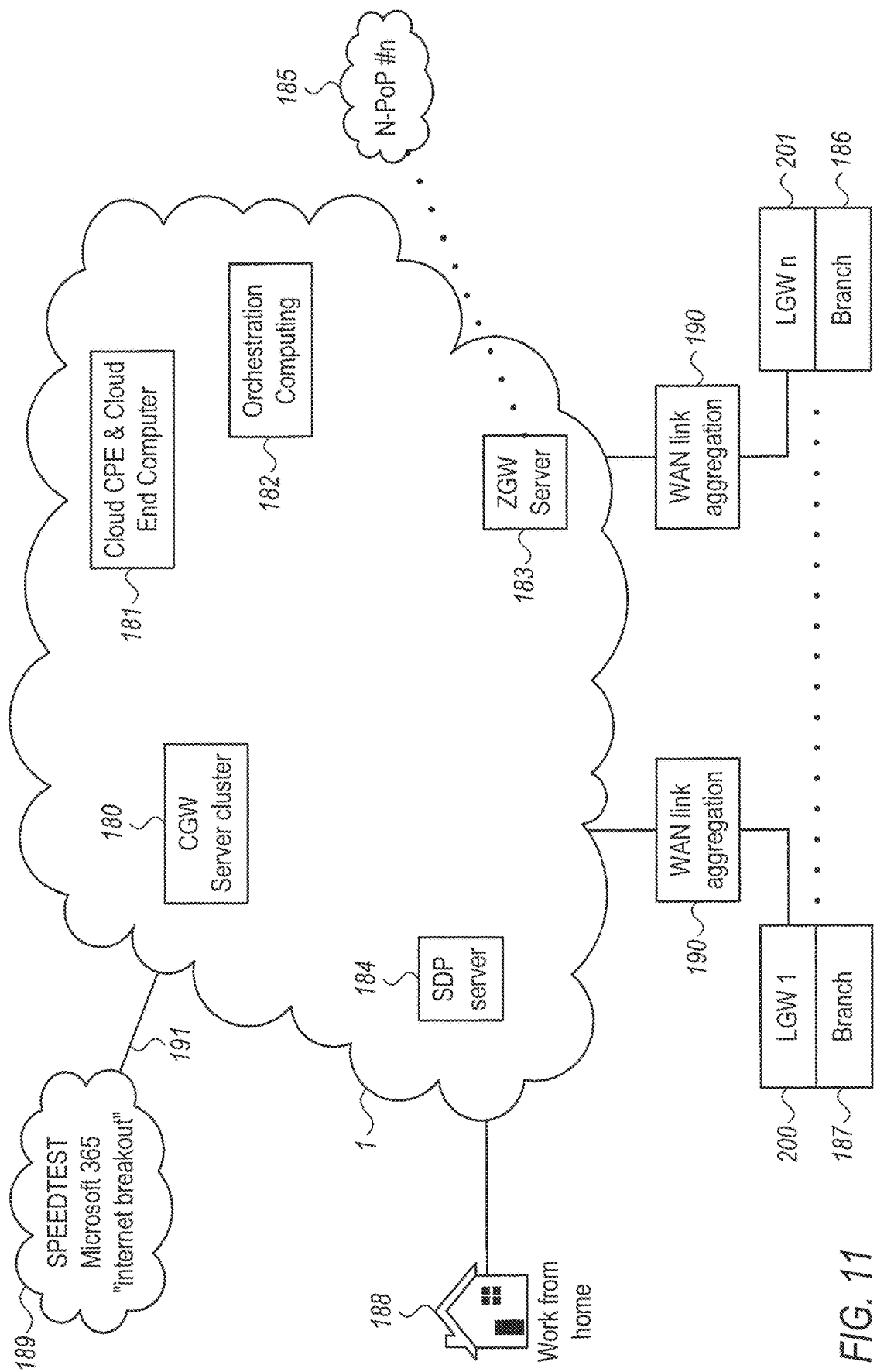
FIG. 11 illustrates an example point of presence demonstrating a variety of tenants and SD-WAN services.

Reference is made to FIG. 11 which illustrates an example point of presence demonstrating a variety of tenants and SD-WAN services. A point of presence (POP) 1 may contain one or more of several devices within its network: a cloud CPE and cloud end computer 181; a device for orchestration 182; a ZGW server 183; and an SPD server 184. The ZGW server 183 may contain an xGW program configured as a zone gateway (ZGW) and be in communication with at least one other point of presence (POP) 185. The CGW server cluster may contain one or more xGWs configured as cloud gateways (CGWs) within or outside of one or more clusters. According to some embodiments, a CGW cluster may be formed in order to consolidate infrastructure services provided to the CGWs contained therein within an individual POP, and wherein the cluster may contain CGWs that connect to multiple tenants, and wherein a single tenant may be able to connect to multiple PoPs. Branch 187 may be in communication with the POP 1 by use of a channel facilitated by WAN link aggregation 190 and be in communication via the POP 1 with one or more other branches 186, also connected to the POP 1 by the use of channels facilitated by WAN link aggregation 190. The branch 187 and the one or more branches 186 it communicates with may contain one or more xGW configured as a local gateway (LGW) 200 and 201. User devices connecting to a network from outside of a branch 188 may connect directly to the POP 1. Network services, for example a speed test 189 may be utilized through a channel 191 from the POP 1.

Although the present invention has been described with reference to specific embodiments, this description is not meant to be construed in a limited sense. Various modifications of the disclosed embodiments, as well as alternative embodiments of the invention will become apparent to persons skilled in the art upon reference to the description of the invention. It is, therefore, contemplated that the appended claims will cover such modifications that fall within the scope of the invention.

The invention claimed is:

1. A method of zero touch provisioning (ZTP) of a software-defined network (SDN) comprising the steps:
   a. installing an initial multi-gateway (xGW) application on a remote device;
   b. establishing a connection between the xGW application and a bootstrap server on a dedicated management point of presence (POP);
   c. signalling an orchestrator to establish connection with said initial xGW application;
   d. configuring a profile in the bootstrap server associated with a license of a specific tenant;
   e. configuring within the xGW settings relating to IP subnets and designations of connections with at least one other address located on at least one other POP; and
   f. allocating and connecting the xGW on the remote device with other xGW applications installed on and connected to other PoPs to define a network therebetween,
   whereby a software defined network is produced between the remote device and the said at least one other POP comprising the initial xGW on said remote device and said at least one other xGW on said at least one other PoPs wherein all xGWs on all PoPs within the SDN are controlled autonomously by at least one orchestrator.

2. The method of zero touch provisioning (ZTP) of a software-defined network (SDN) of claim 1, wherein the steps (b) and (c) are executed automatically by the xGW installed on the remote device.

3. The method of zero touch provisioning (ZTP) of a software-defined network (SDN) of claim 1, wherein the steps (d), (e), and (f) are executed by the orchestrator application installed on the bootstrap server on a dedicated PoP.

4. The method of zero touch provisioning (ZTP) of a software-defined network (SDN) of claim 1, wherein the step (a) is executed by a remote user in a manner not requiring any manual provisioning of the means of communication with the network available to said remote device.

5. The method of zero touch provisioning (ZTP) of a software-defined network (SDN) of claim 4 comprising an additional step between steps (b) and (c): sending to the user an email providing manual activation instructions for initial configuration of the xGW as associated with a particular license.

6. The method of zero touch provisioning (ZTP) of a software-defined network (SDN) of claim 1, wherein after a connection is established with the orchestrator the initial xGW is configured by the orchestrator as a local internal gateway (IGW); or a local gateway (LGW); or a cloud gateway (CGW); or a zone gateway (ZGW); or as a host gateway (HGW).

7. The method of zero touch provisioning (ZTP) of a software-defined network (SDN) of claim 1, wherein step (f) further comprises the allocation of other xGW applications on other PoPs as adjacent to that of the initial xGW on the remote device.

8. The method of zero touch provisioning (ZTP) of a software-defined network (SDN) of claim 7, wherein allocation of adjacent xGWs is achieved by calculating risk and mitigation thereof arising from the consideration of factors including but not limited to: the PoPs most easily communicated with; the computational resources at those PoPs; the cost of establishing a backup xGW at those PoPs; the POP with the highest performance; the number of backup xGWs required at those PoPs; the cost of establishing a tunnel between xGWs at those PoPs; and the number of tunnels required at those PoPs.

9. The method of zero touch provisioning (ZTP) of a software-defined network (SDN) of claim 1, further comprising a step between steps (c) and (d): verifying the identity of the user in relation to a license and thereby authorizing access to a SDN.

10. The method of zero touch provisioning (ZTP) of a software-defined network (SDN) of claim 9, whereby the verification of a user's identity further comprises the identification of the hardware and operating system of the remote device the user is using.

11. The method of zero touch provisioning (ZTP) of a software-defined network (SDN) of claim 9, whereby a license is validated by a dedicated license server.

12. The method of zero touch provisioning (ZTP) of a software-defined network (SDN) of claim 11, whereby the license validation process is repeated after the duration of a pre-determined period of time.

13. The method of zero touch provisioning (ZTP) of a software-defined network (SDN) of claim 9, whereby password renewal is provided by the orchestrator to the user is unable to insert the password.

14. The method of zero touch provisioning (ZTP) of a software-defined network (SDN) of claim 9, whereby the verification of a user's identity further comprises the following steps:
  a. defining a RESTful API with the initial xGW wherein said RESTful API is defined by user inputs including email, password, and the URL of the orchestrator, and sending said RESTful API to the bootstrap server;
  b. receiving the RESTful API the bootstrap server and assigning therefrom a license key validatable and activatable by the orchestrator in communication with a dedicated license server.

15. The method of zero touch provisioning (ZTP) of a software-defined network (SDN) of claim 14, further comprising the steps taken after step (b): determining with an orchestrator from the RESTful API a means of multi-factor authentication based on the information associated with the initial user contained in the RESTful API.

16. The method of zero touch provisioning (ZTP) of a software-defined network (SDN) of claim 15, further comprising the steps taken after step (b): authentication of connection by matching asymmetric cryptographic codes including at least one private key and at least one public key.

17. The method of zero touch provisioning (ZTP) of a software-defined network (SDN) of claim 16, wherein authentication of connection is further dependent on an additional symmetric-key cryptographic method using a pre-shared key known to both the user at the remote device and the bootstrap server.

18. The method of zero touch provisioning (ZTP) of a software-defined network (SDN) of claim 1, whereby the connection established between the remote device and the SDN is limited by the orchestrator if there is no user activity detected for a pre-determined period of time.

19. The method of zero touch provisioning (ZTP) of a software-defined network (SDN) of claim 1, whereby multiple tenants with similar network configurations can be allocated a single shared initial profile, whereby the computational load of zero touch provisioning for said multiple tenants is limited by the said single shared profile.

* * * * *